US009399527B2

(12) United States Patent
Lee et al.

(10) Patent No.: US 9,399,527 B2
(45) Date of Patent: Jul. 26, 2016

(54) APPARATUS AND METHOD FOR CONTROLLING GEOSTATIONARY ORBIT SATELLITE

(71) Applicant: Electronics and Telecommunications Research Institute, Daejeon (KR)

(72) Inventors: Byoung Sun Lee, Daejeon (KR); Yoo La Hwang, Daejeon (KR)

(73) Assignee: Electronics and Telecommunications Research Instit, Daejeon (KR)

( * ) Notice: Subject to any disclaimer, the term of this patent is extended or adjusted under 35 U.S.C. 154(b) by 272 days.

(21) Appl. No.: 13/913,005

(22) Filed: Jun. 7, 2013

(65) Prior Publication Data

US 2013/0327893 A1    Dec. 12, 2013

(30) Foreign Application Priority Data

Jun. 7, 2012 (KR) .......................... 10-2012-0060893
Oct. 5, 2012 (KR) .......................... 10-2012-0110753

(51) Int. Cl.
| B64G 1/24 | (2006.01) |
| B64G 1/10 | (2006.01) |
| B64G 1/00 | (2006.01) |
| B64G 1/52 | (2006.01) |

(52) U.S. Cl.
CPC ................ B64G 1/242 (2013.01); B64G 1/007 (2013.01); B64G 1/1007 (2013.01); B64G 1/24 (2013.01); B64G 1/52 (2013.01)

(58) Field of Classification Search
CPC .......... B64G 1/242; B64G 1/10; B64G 1/007; B64G 1/1007; B64G 1/24; B64G 1/52
USPC .................................. 244/158.8, 158.4–158.6
See application file for complete search history.

(56) References Cited

U.S. PATENT DOCUMENTS 5,855,341 A * 1/1999 Aoki et al. ................. 244/158.8
5,983,161 A   11/1999 Lemelson et al.
6,133,870 A   10/2000 Wehner
2013/0292517 A1 * 11/2013 Briskman .................. 244/158.8

OTHER PUBLICATIONS

Eberhard Gill, Precise GNSS-2 Satellite Orbit Determination Based on Inter-Satellite-Links, 14th International Symposium on Space Flight Mechanics, Feb. 8-12, 1999, pp. 1-8, Iguassu, Brazil.

* cited by examiner

*Primary Examiner* — Nga X Nguyen
(74) *Attorney, Agent, or Firm* — William Park & Associates Ltd.

(57) ABSTRACT

An apparatus and method for controlling a geostationary orbit satellite is provided. The method including generating remote measurement data by measuring a state of a geostationary orbit satellite, transmitting the remote measurement data, receiving a remote command signal, and controlling an orbit and a pose of the geostationary orbit satellite relative to inclined geosynchronous space debris.

12 Claims, 8 Drawing Sheets

APPARATUS AND METHOD FOR CONTROLLING GEOSTATIONARY ORBIT SATELLITE

CROSS-REFERENCE TO RELATED APPLICATION

This application claims the priority benefit of Korean Patent Application No. 10-2012-0060893, filed on Jun. 7, 2012, and Korean Patent Application No. 10-2012-0110753, filed on Oct. 5, 2012, in the Korean Intellectual Property Office, the disclosure of which is incorporated herein by reference.

BACKGROUND

1. Field of the Invention

Exemplary embodiments of the present invention relate to an apparatus and method for controlling a geostationary orbit satellite, and more particularly, to an apparatus and method for controlling an orbit and a pose of a geostationary orbit satellite to avoid collisions with space debris in an inclined geosynchronous orbit while keeping in a geostationary orbit normally.

2. Description of the Related Art

A geostationary orbit satellite appears to be in a fixed position when viewed from a particular location on the Earth because the geostationary orbit satellite has an orbital period equal to the rotation period, 23 hours 56 minutes 4 seconds, to that of the Earth. For this reason, geostationary orbit satellites are widely used for communication, broadcasting, Earth observation, global positioning system (GPS) augmentation, and the like. The geostationary orbit satellite is positioned about 36,000 kilometers (km) above the Equator, and has an inclination close to zero degrees.

To prevent mutual interference and physical collision between satellites, the geostationary orbit satellite occupies a predetermined area, and a limited number of geostationary orbit satellites is allowed for one particular orbit. Also, an international registration/notification procedure for allocation of a predetermined frequency in satellite communication is established to prevent potential interference conflicts.

Generally, the lifespan of a geostationary orbit satellite is ten to fifteen years, and is dependent on a supply of fuel supply needed to maintain a location in a predetermined area. According to international regulations, a de-orbiting strategy is recommended. A satellite may be de-orbited to re-enter an altitude of 200 km or higher at the end of a lifespan using the residual fuel, to make room for a new satellite.

Currently, a considerable amount of space debris, also known as space waste, is floating in orbit around the Earth. A majority of space debris consists of dead or inoperable geostationary orbit satellites remaining in orbit due to re-entry failure. Other pieces of debris are fragments of rocket bodies used to place geostationary orbit satellites into orbit.

By the effects of various perturbations such as, for example, the asymmetrical gravitational field of the Earth, gravitational attraction of the moon and the sun, and solar radiation pressure, space debris may transfer to an inclined and eccentric geosynchronous orbit.

The orbit inclination gradually increases to 15 degrees and reverts to 0 degrees over a 53 year period. Space debris in an inclined geosynchronous orbit passes through the equatorial plane of the Earth twice each sidereal day. Accordingly, when space debris approaches a geostationary orbit satellite working normally, a collision may occur. To resolve this collision issue, performing orbital maneuvers for a geostationary orbit satellite is needed to ensure a safe distance from space debris.

SUMMARY

According to an aspect of the present invention, there is provided an apparatus for controlling a geostationary orbit satellite, the apparatus including a data processing unit to generate remote measurement data by measuring a state of a geostationary orbit satellite, a signal transmitting/receiving unit to receive a remote command signal and to transmit the remote measurement data, and a satellite control unit to control an orbit and a pose of the geostationary orbit satellite relative to inclined geosynchronous space debris.

The data processing unit may convert the remote measurement signal to control command data for the geostationary orbit satellite, and may transmit the control command data to the satellite control unit.

The apparatus may further include a power supply unit to supply power to the geostationary orbit satellite by controlling the satellite control unit.

The apparatus may further include a satellite propulsion unit to control the orbit and the pose of the geostationary orbit satellite by controlling the satellite control unit.

The satellite control unit may include a detection unit to detect an orbital element of the inclined geosynchronous space debris, and a determination unit to determine, based on the detected orbital element, a time and a direction of an orbital maneuver of the geostationary orbit satellite being performed.

The satellite control unit may further include a distance output unit to output a closest approach distance between the geostationary orbit satellite and the inclined geosynchronous space debris after performing the orbital maneuver of the geostationary orbit satellite.

The detection unit may detect a perigee location of the inclined geosynchronous space debris.

The satellite control unit may control a radial separation between the geostationary orbit satellite and the inclined geosynchronous space debris to maintain a predetermined safe distance for collision avoidance when the inclined geosynchronous space debris passes through the equatorial plane of the Earth.

The satellite control unit may adjust a velocity of the geostationary orbit satellite to maintain the predetermined safe distance for collision avoidance between the geostationary orbit satellite and the inclined geosynchronous space debris.

According to another aspect of the present invention, there is provided a method of controlling a geostationary orbit satellite, the method including generating remote measurement data by measuring a state of a geostationary orbit satellite, transmitting the remote measurement data, receiving a remote command signal, and controlling an orbit and a pose of the geostationary orbit satellite relative to inclined geosynchronous space debris.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
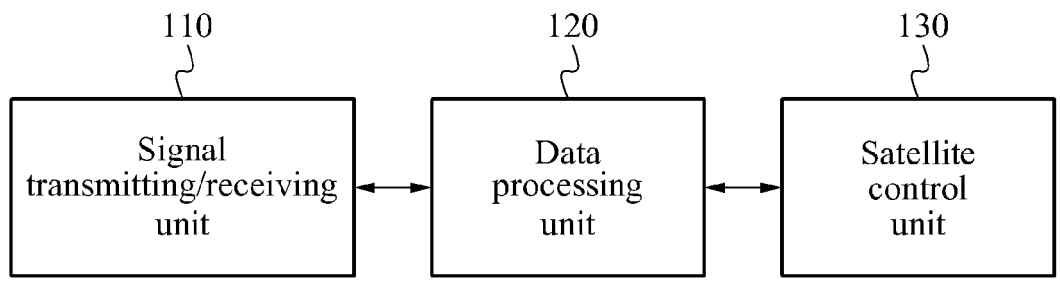
FIG. 1 is a block diagram illustrating a structure of an apparatus for controlling a geostationary orbit satellite according to an exemplary embodiment of the present invention.

Reference will now be made in detail to exemplary embodiments of the present invention, examples of which are illustrated in the accompanying drawings. The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein. Like reference numerals refer to the like elements throughout.

FIG. 1 is a block diagram illustrating a structure of an apparatus for controlling a geostationary orbit satellite according to an exemplary embodiment of the present invention.

Referring to FIG. 1, the apparatus for controlling a geostationary orbit satellite may include a data processing unit 120 to generate remote measurement data by measuring a state of a geostationary orbit satellite, a signal transmitting/receiving unit 110 to receive a remote command signal and transmit the remote measurement data, and a satellite control unit 130 to control an orbit and a pose of the geostationary orbit satellite relative to inclined geosynchronous space debris.

Prior to a detailed description of the apparatus for controlling a geostationary orbit satellite, an orbital element of inclined geosynchronous space debris for maintaining a geostationary orbit satellite at a safe distance from the inclined geosynchronous space debris will be described.

The term "inclined geosynchronous space debris" used herein may refer to space debris in an inclined geosynchronous orbit.

Figure 2:
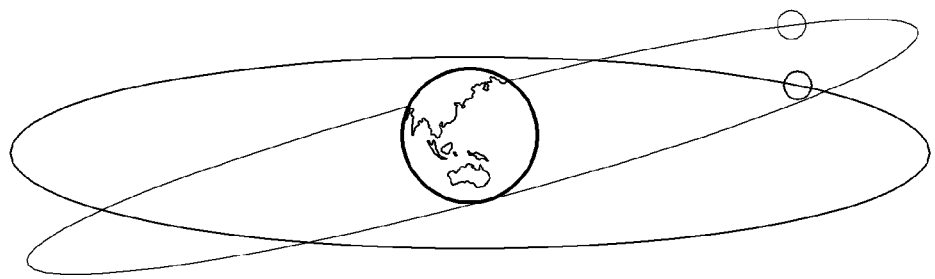
FIG. 2 is a diagram illustrating a geostationary orbit and an inclined geosynchronous orbit.

FIG. 2 is a diagram illustrating a geostationary orbit and an inclined geosynchronous orbit.

Referring to FIG. 2, inclined geosynchronous space debris may approach a geostationary orbit satellite at the same longitude when the inclined geosynchronous space debris passes through the equatorial plane of the Earth twice each sidereal day.

Figure 3:
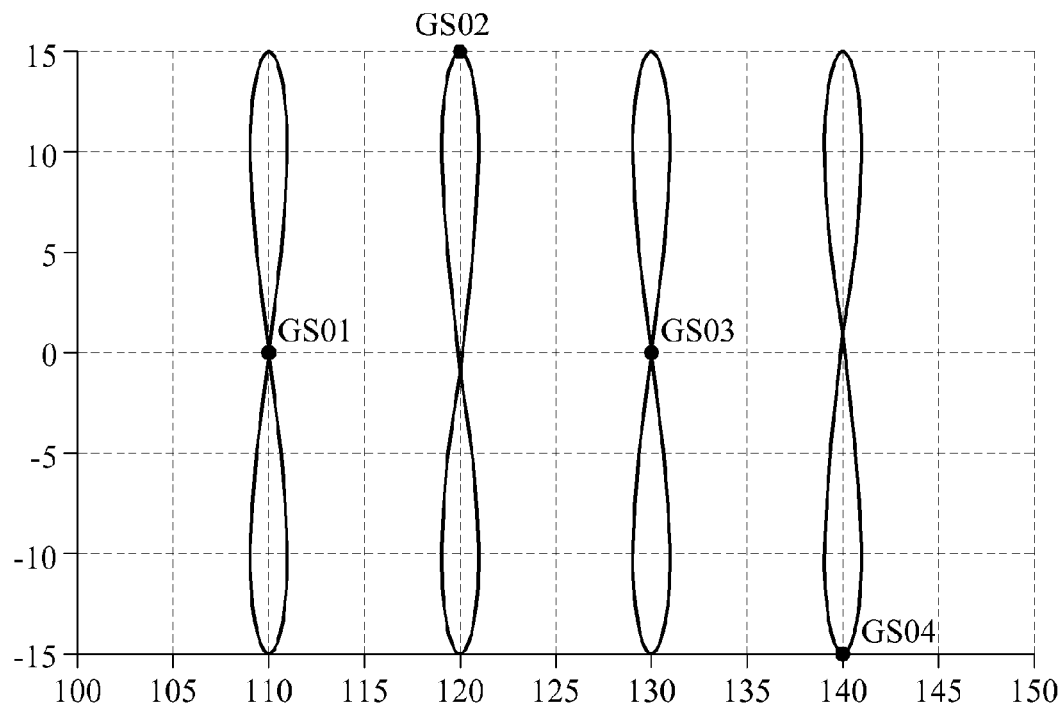
FIG. 3 is a diagram illustrating ground traces of four types of inclined geosynchronous orbits.

FIG. 3 is a diagram illustrating ground traces of four types of inclined geosynchronous orbits.

Referring to FIG. 3, inclined geosynchronous space debris may follow a ground trace in a shape of a figure eight, and a crossing point of the ground trace may be located above the Equator or away from the Equator in a northern or southern direction, based on an argument of perigee of an orbit. Orbital elements of inclined geosynchronous orbits of FIG. 3 are shown in Table 1.

TABLE 1

| | Orbital elements | | | |
| --- | --- | --- | --- | --- |
| | IGSO1 | IGSO2 | IGSO3 | IGSO4 |
| Argument of perigee (deg) | 0 | 90 | 180 | 270 |
| Longitude of ascending node (deg) | 110 | 120 | 130 | 140 |
| Period (sec) | 86164.091 | | | |
| Eccentricity | 0.001 | | | |
| Inclination (deg) | 15 | | | |
| True anomaly (deg) | 0 | | | |

Figure 4:
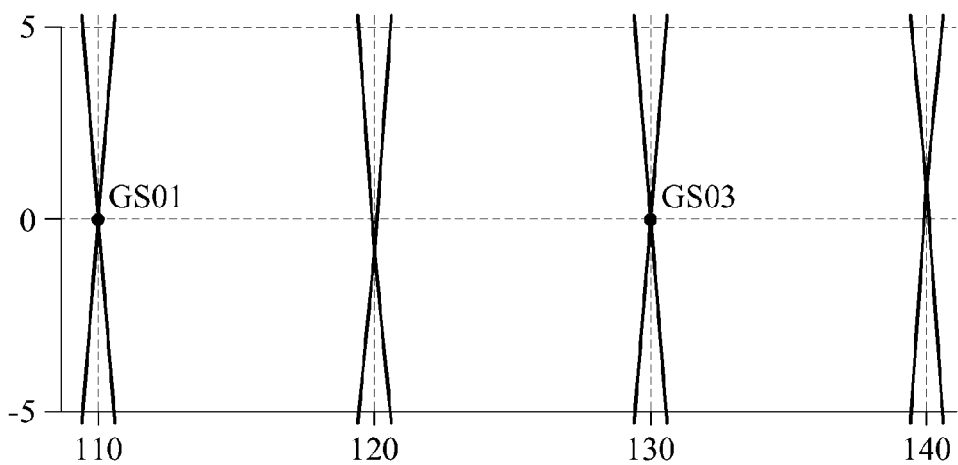
FIG. 4 is a diagram illustrating ground traces of the inclined geosynchronous orbits of FIG. 3 near the equatorial plane of the Earth.

FIG. 4 is a diagram illustrating ground traces of the inclined geosynchronous orbits of FIG. 3 near the equatorial plane of the Earth.

Referring to FIG. 4 and Table 1, a crossing point of a ground trace may vary depending on an argument of perigee. When the argument of perigee is 0 degrees or 180 degrees, the crossing point may be located above the Equator. When the argument of perigee is 90 degrees, the crossing point may be located away from the Equator in a southern direction. When the argument of perigee is 270 degrees, the crossing point may be located away from the Equator in a northern direction.

Table 2 shows a change of orbital radius with a true anomaly for the inclined geosynchronous orbits of Table 1.

TABLE 2

| Change of orbital radius with true anomaly | | | |
| --- | --- | --- | --- |
| True anomaly (deg) | Orbital radius (km) | Difference from perigee radius (km) | Comments |
| 0 | 42122.0055 | 0 | Perigee |
| 45 | 42134.3340 | 12.3285 | |
| 90 | 42164.1275 | 42.1220 | |
| 135 | 42193.9631 | 71.9576 | |
| 180 | 42206.3338 | 84.3283 | Apogee |
| 225 | 42193.9631 | 71.9576 | |
| 270 | 42164.1275 | 42.1220 | |
| 315 | 42134.3340 | 12.3285 | |

Referring to Table 2, when the true anomaly is 0 degrees, to be precise, at perigee, the orbital radius may be at a minimum, and when the true anomaly is 180 degrees, to be precise, at apogee, the orbital radius may be at a maximum. A difference of orbital radius at perigee and apogee may be 84.3283 kilometers (km) with an eccentricity of 0.001. The difference Δr of orbital radius at perigee and apogee may be calculated through Equation 1.

$$\Delta r = 2ae \qquad \text{[Equation 1]}$$

Here, a may denote a semi-major axis, and e may denote an eccentricity.

Figure 5:
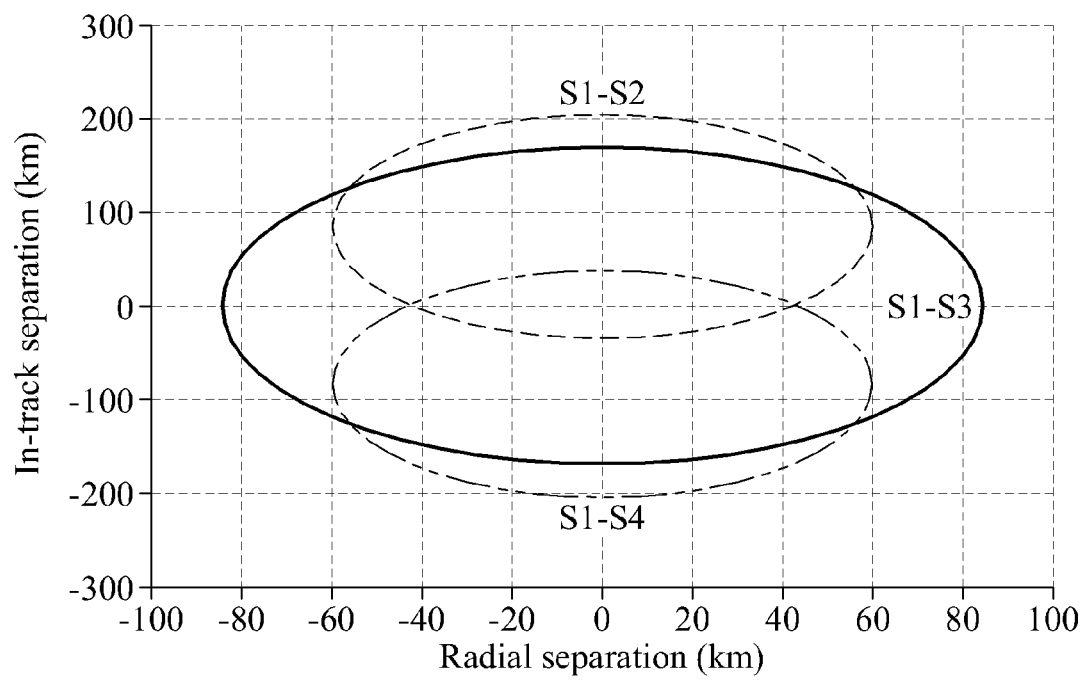
FIG. 5 is a graph illustrating a radial separation and an in-track separation between one space debris and the other space debris among four inclined geosynchronous space debris having the same longitude ascending node as shown in Table 1.

FIG. 5 is a graph illustrating a radial separation and an in-track separation between one piece of space debris and other space debris among four pieces of inclined geosynchronous space debris having the same longitude ascending node as shown in Table 1.

Referring to FIG. 5, among four inclined geosynchronous space debris S1, S2, S3, and S4, S1-S3 having a difference in argument of perigee of 180 degrees may have a radial separation of 84.3238 km when an in-track separation is 0, and may have an in-track separation of 100 km or longer when a radial separation is 0.

S1-S2 having a difference in argument of perigee of 90 degrees and S1-S4 having a difference in argument of perigee of 270 degrees may have an in-track separation of about 34.3 km or more to the minimum when a radial separation is 0.

Figure 6:
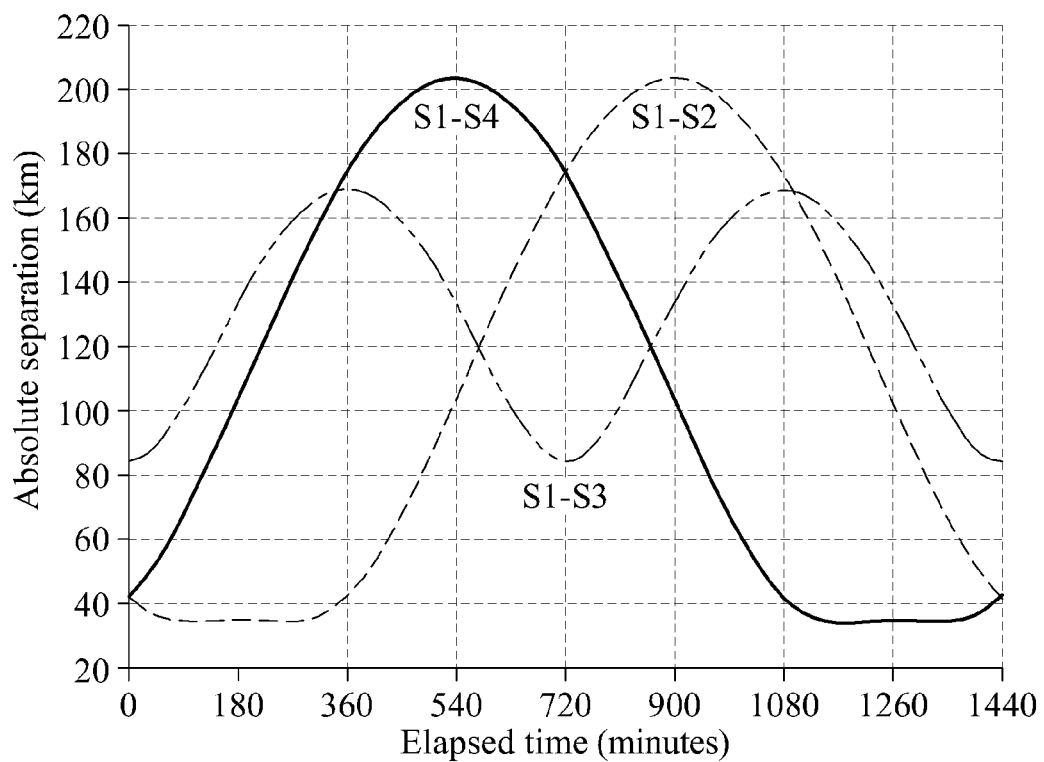
FIG. 6 is a graph illustrating a change in absolute separation over time in four inclined geosynchronous orbits of FIG. 5.

FIG. 6 is a graph illustrating a change in absolute separation over time in the four inclined geosynchronous orbits of FIG. 5.

Referring to FIG. 6, S1-S3 may have an absolute separation of 84.3238 km or longer as the minimum, and S1-S2 and S1-S4 may have an absolute separation of 34.3 km or longer as the minimum. Inclined geosynchronous orbits having different arguments of perigee may maintain an absolute separation.

When an orbit maneuver is performed using fuel, orbital elements of a stationary orbit may be changed as shown in Equations 2 (a) through (e).

Here, $\Delta V_T$ may denote a tangential velocity change, $\Delta V_N$ may denote a normal velocity change, $\Delta d$ may denote a drift rate change, and $\Delta a$ may denote a semi-major axis change.

$$\Delta d = -\frac{3\omega_E}{V_{syn}}\Delta V_T \quad \text{[Equation 2 (a)]}$$

or $$\Delta a = \frac{2a_{syn}}{V_{syn}}\Delta V_T$$

$$\Delta e_c = \frac{2\Delta V_T}{V_{syn}}\cos\alpha \quad \text{[Equation 2 (b)]}$$

$$\Delta e_s = \frac{2\Delta V_T}{V_{syn}}\sin\alpha \quad \text{[Equation 2 (c)]}$$

$$\Delta W_c = \frac{\Delta V_N}{V_{syn}}\cos\alpha \quad \text{[Equation 2 (d)]}$$

$$\Delta W_s = \frac{\Delta V_N}{V_{syn}}\sin\alpha \quad \text{[Equation 2 (e)]}$$

Here, $\omega_E$ may correspond to an angular velocity of the Earth, $V_{syn}$ may correspond to a synchronous velocity, 3.0747 km/s, along a geostationary orbit, $a_{syn}$ may correspond to a synchronous semi-major axis, 42164.1696 km, for a geostationary orbit, and α may correspond to a right ascension of a satellite.

Also, an eccentricity vector $e(e_c, e_s)$ and an inclination vector $W(W_c, W_s)$ may be defined as shown in Equations 3 (a) through (d).

$$e_c = e\cos(\omega+\Omega) \quad \text{[Equation 3 (a)]}$$

$$e_s = e\sin(\omega+\Omega) \quad \text{[Equation 3 (b)]}$$

$$W_c = \sin i \cos\Omega \quad \text{[Equation 3 (c)]}$$

$$W_s = \sin i \sin\Omega \quad \text{[Equation 3 (d)]}$$

Figure 7:
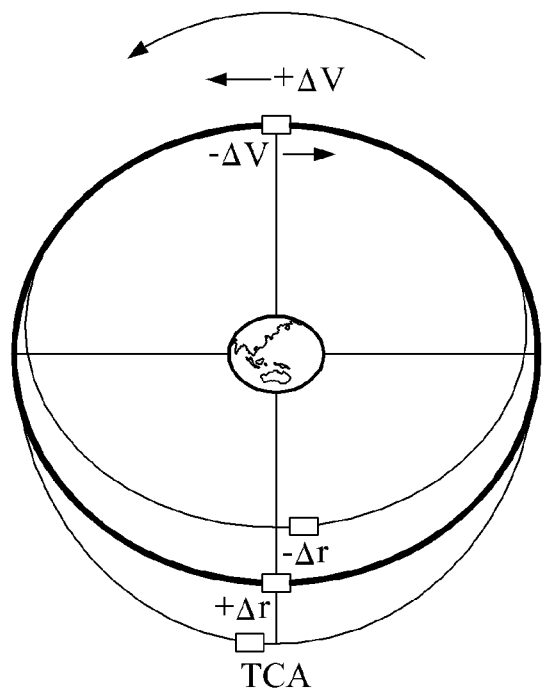
FIG. 7 is a diagram illustrating a change in orbit with a velocity change of a geostationary orbit satellite.

FIG. 7 is a diagram illustrating a change in orbit with a velocity change (ΔV) of a geostationary orbit satellite.

Referring to FIG. 7, when +ΔV operation is performed, an orbit of a geostationary orbit satellite may be increased by +Δr in 12 hours, and when −ΔV operation is performed, an orbit of a geostationary orbit satellite may be decreased by −Δr in 12 hours. This change may have a value twice greater than a semi-major axis change of the orbit.

$$\Delta r = 2\Delta a \quad \text{[Equation 4]}$$

Hereinafter, a further detailed description of an apparatus for controlling a geostationary orbit satellite according to an exemplary embodiment of the present invention is provided based on the orbital elements of the geostationary orbit satellite and the inclined geosynchronous space debris.

Figure 8:
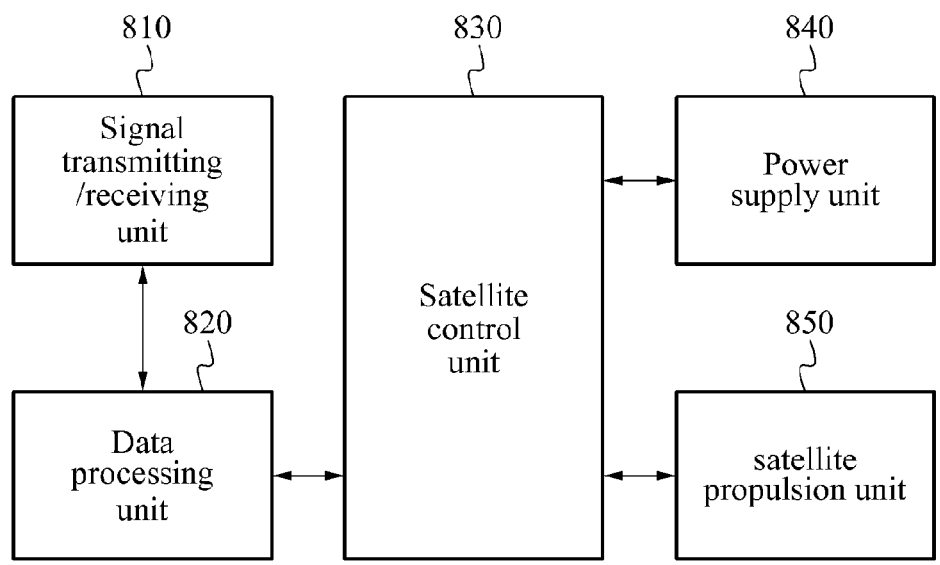
FIG. 8 is a block diagram illustrating a detailed structure of an apparatus for controlling a geostationary orbit satellite according to an exemplary embodiment of the present invention.

FIG. 8 is a block diagram illustrating a detailed structure of an apparatus for controlling a geostationary orbit satellite according to an exemplary embodiment of the present invention.

Referring to FIG. 8, the apparatus for controlling a geostationary orbit satellite may include a signal transmitting/receiving unit 810, a data processing unit 820, and a satellite control unit 830.

The signal transmitting/receiving unit 810 may receive a remote command signal and may transmit remote measurement data.

The data processing unit 820 may generate remote measurement data by measuring a state of a geostationary orbit satellite, may convert the remote command signal to control command data for the geostationary orbit satellite, and may transmit the control command data to the satellite control unit 830.

The satellite control unit 830 may control an orbit and a pose of the geostationary orbit satellite relative to inclined geosynchronous space debris based on the control command data.

The apparatus for controlling a geostationary orbit satellite may further include a power supply unit 840 to supply power to the geostationary orbit satellite by controlling the satellite control unit 830.

Also, the apparatus for controlling a geostationary orbit satellite may further include a satellite propulsion unit 850 to adjust the orbit and the pose of the geostationary orbit satellite using a rocket propulsion device by controlling the satellite control unit 830.

Figure 9:
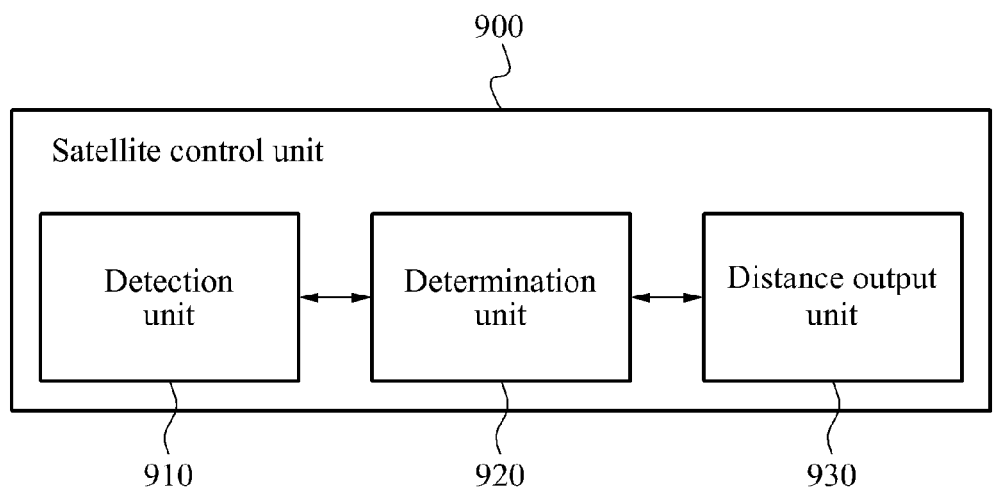
FIG. 9 is a block diagram illustrating a satellite control unit according to an exemplary embodiment of the present invention.

FIG. 9 is a block diagram illustrating a satellite control unit 900 according to an exemplary embodiment of the present invention.

Referring to FIG. 9, the satellite control unit 900 may include a detection unit 910, a determination unit 920, and a distance output unit 930.

The detection unit 910 may detect an orbital element of the inclined geosynchronous space debris, for example, a perigee location of the inclined geosynchronous space debris.

The determination unit 920 may determine, based on the detected orbital element, a time and a direction in which an orbital maneuver of the geostationary orbit satellite is performed.

The distance output unit 930 may output a closest approach distance between the geostationary orbit satellite and the inclined geosynchronous space debris after performing the orbital maneuver of the geostationary orbit satellite.

The satellite control unit may control a radial separation between the geostationary orbit satellite and the inclined geosynchronous space debris to maintain a predetermined safe distance for collision avoidance when the inclined geosynchronous space debris passes through the equatorial plane of the Earth.

The satellite control unit may adjust a velocity of the geostationary orbit satellite to maintain the predetermined safe distance for collision avoidance between the geostationary orbit satellite and the inclined geosynchronous space debris.

Hereinafter, an example of comparing orbital elements of a geostationary orbit satellite and inclined geosynchronous space debris and changing an orbit and a pose of the geostationary orbit satellite to maintain a safe distance from the inclined geosynchronous space debris will be provided.

Table 3 provides a summary of orbital elements of a functional geostationary orbit satellite and inclined geosynchronous space debris approaching the functional geostationary orbit satellite.

TABLE 3

| Name | SL-12 R/B(2) | COMS1 |
|---|---|---|
| NORAD ID | 14195 | 36744 |
| Int'l Code | 1981-102F | 2010-032A |
| Orbit type | IGSO | GEO |
| Perigee (km) | 35,753.9 | 35783 |
| Apogee (km) | 35,880.2 | 35791 |
| Inclination (deg) | 14.6 | 0.03 |
| Period (min) | 1,437.3 | 1436.12 |
| Semi-major Axis (km) | 42,188.0 | 42164.14 |
| Eccentricity | 0.0014972 | 0.0000675 |
| Launch Date | Oct. 9, 1981 | Jun. 26, 2010 |

Table 4 shows a separation between the geostationary orbit satellite and the inclined geosynchronous space debris of Table 3.

TABLE 4

| Maneuver | Radial | In-track | Cross-track | Separation |
|---|---|---|---|---|
| None | −3.739 | −0.999 | −0.145 | 3.873 |
| +0.1 m/s | −9.244 | 11.979 | −0.145 | 15.132 |

The inclined geosynchronous space debris may be close to the geostationary orbit satellite at a distance of 3.837 km on Apr. 6, 2012, Universal Time (UT), 1:44:51.12. Also, radial, in-track, and cross-track separations are shown in Table 4.

Before orbital maneuvers are performed, the radial separation is −3.739 km and the total separation is 3.873 km, and a risk of collision exists. However, after an orbital maneuver is performed by changing a velocity of the geostationary orbit satellite by +0.1 m/s, the total separation between the geostationary orbit satellite and the inclined geosynchronous space debris may become longer than a predetermined safe distance.

The orbital maneuver for the geostationary orbit satellite through velocity adjustment may lead to a radial separation −9.244 km and a total separation 15.132 km sufficient to ensure a safe distance, resulting in a reduced risk of collision.

Figure 10:
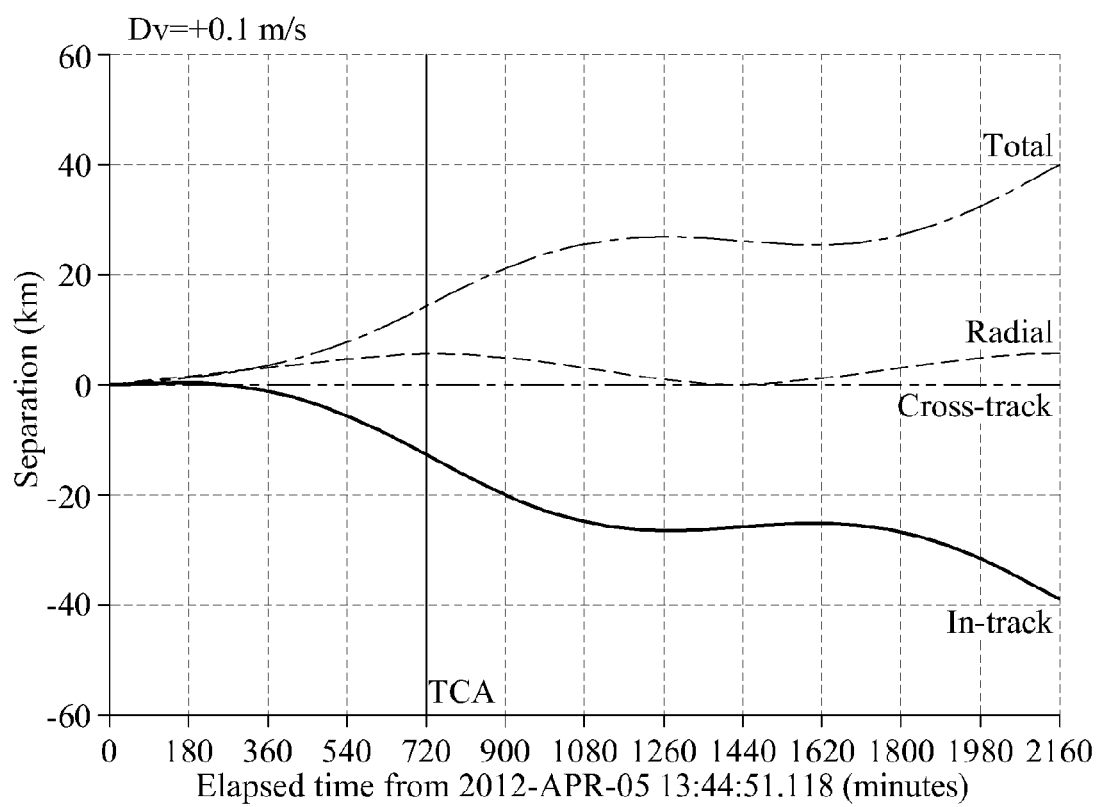
FIG. 10 is a graph illustrating changed separation through performing orbital maneuvers for a geostationary orbit satellite according to an exemplary embodiment of the present invention.

FIG. 10 is a graph illustrating changed separation through orbital maneuver for a geostationary orbit satellite according to an exemplary embodiment of the present invention.

Referring to FIG. 10, the apparatus for controlling a geostationary orbit satellite may increase an orbital velocity of the geostationary orbit satellite by +0.1 m/s to increase a radial separation between the geostationary orbit satellite and the inclined geosynchronous space debris.

The radial separation between the geostationary orbit satellite and the inclined geosynchronous space debris is 9.244 km at a time of closest approach (TCA) and decreases over a 12 hour period, however, the total separation increases gradually by the effect of the in-track separation to ensure safety of the geostationary orbit satellite.

Hereinafter, a method of controlling a geostationary orbit satellite according to an exemplary embodiment of the present invention is described.

Figure 11:
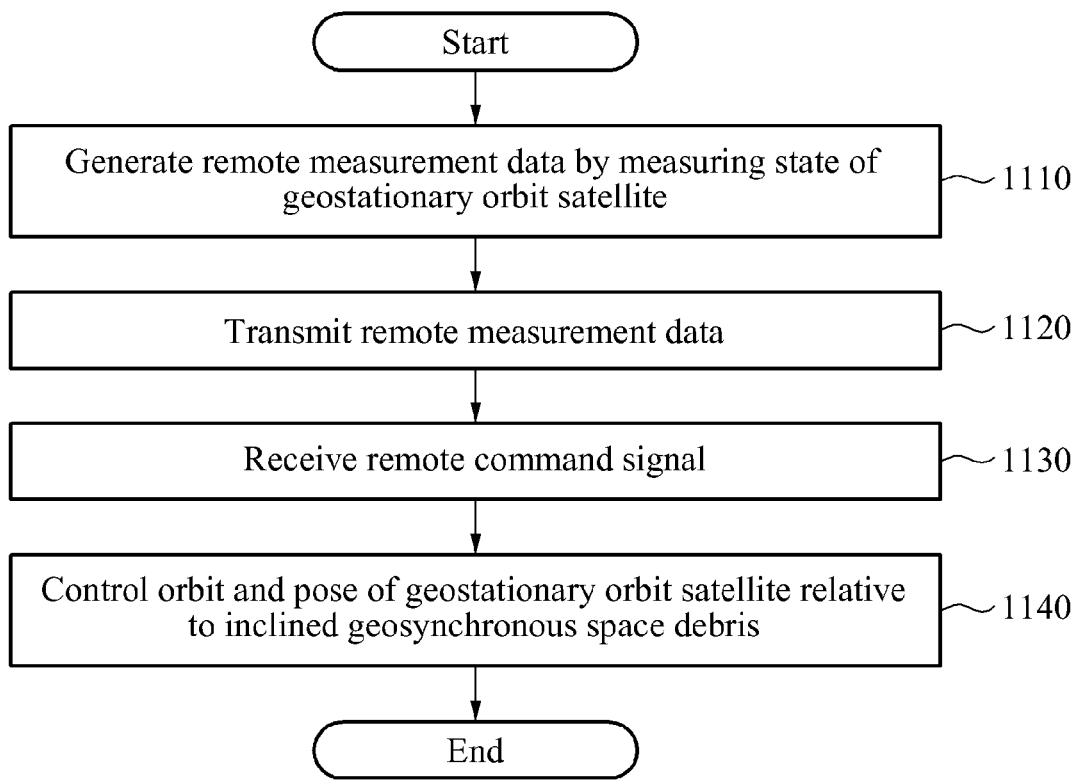
FIG. 11 is a flowchart illustrating a method of controlling a geostationary orbit satellite according to an exemplary embodiment of the present invention.

FIG. 11 is a flowchart illustrating a method of controlling a geostationary orbit satellite according to an exemplary embodiment of the present invention.

Referring to FIG. 11, the apparatus for controlling a geostationary orbit satellite may generate remote measurement data by measuring a state of the geostationary orbit satellite in operation 1110, may transmit the remote measurement data in operation 1120, and may receive a remote command signal in operation 1130.

In operation 1140, the apparatus for controlling a geostationary orbit satellite may convert the remote command signal to control command data, and may control an orbit and a pose of the geostationary orbit satellite relative to inclined geosynchronous space debris based on the control command data.

According to an aspect of the present invention, the apparatus for controlling a geostationary orbit satellite may control a radial separation between the geostationary orbit satellite and the inclined geosynchronous space debris to maintain a predetermined safe distance for collision avoidance when the inclined geosynchronous space debris passes through the equatorial plane of the Earth.

According to another aspect of the present invention, the apparatus for controlling a geostationary orbit satellite may control a velocity of the geostationary orbit satellite to maintain the predetermined safe distance for collision avoidance between the geostationary orbit satellite and the inclined geosynchronous space debris.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such to as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for controlling a geostationary orbit satellite, the apparatus comprising:
   a data processing unit to generate remote measurement data by measuring a state of a geostationary orbit satellite;

a signal transmitting/receiving unit to receive a remote command signal and to transmit the remote measurement data; and a satellite control unit to control an orbit and a pose of the geostationary orbit satellite relative to inclined geosynchronous space debris, wherein the geostationary orbit satellite is maintained at a predetermined safe distance from the inclined geosynchronous space debris when the inclined geosynchronous pace debris passes through an equatorial plane of earth, wherein the satellite control unit controls a radial separation between the geostationary orbit satellite and the inclined geosynchronous space debris to maintain the predetermined safe distance for collision avoidance when the inclined geosynchronous space debris passes through the equatorial plane of the Earth, and wherein the satellite control unit adjusts a velocity of the geostationary orbit satellite to maintain the predetermined safe distance for collision avoidance between the geostationary orbit satellite and the inclined geosynchronous space debris.

2. The apparatus of claim 1, wherein the data processing unit converts the remote measurement signal to control command data for the geostationary orbit satellite, and transmits the control command data to the satellite control unit.

3. The apparatus of claim 1, further comprising:
a power supply unit to supply power to the geostationary orbit satellite by controlling the satellite control unit.

4. The apparatus of claim 1, further comprising:
a satellite propulsion unit to control the orbit and the pose of the geostationary orbit satellite by controlling the satellite control unit.

5. The apparatus of claim 1, wherein the satellite control unit comprises:
a detection unit to detect an orbital element of the inclined geosynchronous space debris; and
a determination unit to determine, based on the detected orbital element, a time and a direction of an orbital maneuver of the geostationary orbit satellite being performed.

6. The apparatus of claim 5, wherein the satellite control unit further comprises:
a distance output unit to output a closest approach distance between the geostationary orbit satellite and the inclined geosynchronous space debris after performing the orbital maneuver of the geostationary orbit satellite.

7. The apparatus of claim 5, wherein the detection unit detects a perigee location of the inclined geosynchronous space debris.

8. A method of controlling a geostationary orbit satellite, the method comprising:
generating remote measurement data by a data processing unit by measuring a state of a geostationary orbit satellite;
transmitting the remote measurement data by a signal transmitting/receiving unit;
receiving a remote command signal by the signal transmitting/receiving unit; and
controlling an orbit and a pose of the geostationary orbit satellite relative to inclined geosynchronous space debris by a satellite control unit,
wherein the satellite control unit maintains the geostationary orbit satellite at a predetermined safe distance from the inclined geosynchronous space debris when the inclined geosynchronous pace debris passes through an equatorial plane of earth,
wherein controlling an orbit comprise controlling a radial separation between the geostationary orbit satellite and the inclined geosynchronous space debris by the satellite control unit to maintain the predetermined safe distance for collision avoidance when the inclined geosynchronous space debris passes through the equatorial plane of the Earth, and
wherein the satellite control unit adjusts a velocity of the geostationary orbit satellite to maintain the predetermined safe distance for collision avoidance between the geostationary orbit satellite and the inclined geosynchronous space debris.

9. The method of claim 8, further comprising:
detecting an orbital element of the inclined geosynchronous space debris by a detection unit; and
determining by a determination unit, based on the detected orbital element, a time and a direction of an orbital maneuver of the geostationary orbit satellite being performed.

10. The method of claim 9, further comprising:
outputting by a distance output unit a closest approach distance between the geostationary orbit satellite and the inclined geosynchronous space debris after performing the orbital maneuver of the geostationary orbit satellite.

11. The method of claim 9, wherein the detecting of the orbital element comprises detecting a perigee location of the inclined geosynchronous space debris.

12. The method of claim 8, further comprising:
adjusting a velocity of the geostationary orbit satellite by the satellite unit to maintain the predetermined safe distance for collision avoidance between the geostationary orbit satellite and the inclined geosynchronous space debris.

* * * * *